United States Patent
Lipson et al.

(10) Patent No.: US 7,764,426 B2
(45) Date of Patent: Jul. 27, 2010

(54) SYSTEM AND METHOD FOR PRODUCING A LIGHT BEAM WITH SPATIALLY VARYING POLARIZATION

(75) Inventors: Stephen Geoffrey Lipson, Haifa (IL); Amir Shoham, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 747 days.

(21) Appl. No.: 10/552,047

(22) PCT Filed: Apr. 4, 2004

(86) PCT No.: PCT/IL2004/000307

§ 371 (c)(1),
(2), (4) Date: Sep. 6, 2006

(87) PCT Pub. No.: WO2004/090578

PCT Pub. Date: Oct. 21, 2004

(65) Prior Publication Data
US 2007/0183036 A1    Aug. 9, 2007

(30) Foreign Application Priority Data
Apr. 9, 2003    (IL) .................................... 155330

(51) Int. Cl.
*G02B 5/30*    (2006.01)
(52) U.S. Cl. .................. 359/489; 359/900; 353/20
(58) Field of Classification Search ........... 359/489
See application file for complete search history.

(56) References Cited

U.S. PATENT DOCUMENTS 3,631,288 A * 12/1971 Rogers ...................... 313/111

OTHER PUBLICATIONS

S.G Lipson, H. Lipson, D.S Tannhauser, "Optical Physics", 3rd ed. Cambridge University Press (1995), pp. ix-xii.
M. Stalder, M. Schadt, "Linearly Polarization Field Using Liquid Crystal Polarization Converters" Optics Letters, (1996), pp. 1948-1950, vol. 21.
Bomzen, G. Biener, V. Kleiner, E. Hasman, "Radially and Azimuthally Polarized Beams" Optics Letters, (2002), pp. 285-287, vol. 27.
P.B Mumola et al., "Unstable Resonators for Annular Gain Volume Lasers", Applied Optics 17, 936-43, (1978).
R.A. Chodzko et al., "Annular Resonators: Some Experimental Studies Including Polarization Effects" Applied Optics, 778-89 (1980), vol. 19.
International Search Report for Application No. PCT/IL04/00307 mailed Nov. 29, 2004.

* cited by examiner

*Primary Examiner*—Stephone B Allen
*Assistant Examiner*—Derek S Chapel
(74) *Attorney, Agent, or Firm*—Pearl Cohen Zedek Latzer, LLP

(57) ABSTRACT

An apparatus for providing a light beam with spatially varying polarization. The apparatus includes: two circumferentially curved reflectors positioned substantially opposite each other, a polarizer positioned in an optical path between the two reflectors, for polarizing light reflected from one reflector before it reaches the other. A non-polarized light beam incident along a given axis on one of the reflectors is radially reflected off that reflector, acquires predetermined polarization from the polarizer and is then reflected off the second reflector to a light beam of spatially varying polarization.

28 Claims, 5 Drawing Sheets

SYSTEM AND METHOD FOR PRODUCING A LIGHT BEAM WITH SPATIALLY VARYING POLARIZATION

CROSS-REFERENCE TO RELATED APPLICATIONS

This application is a National Phase Application of PCT International Application No. PCT/IL2004/000307, International Filing Date Apr. 4, 2004, claiming priority of IL Patent Application, 155330, filed Apr. 9, 2003.

FIELD OF THE INVENTION

The subject of the present invention relates to the field of space-variant polarizers. More particularly, the present invention relates to a system and method for producing a light beam with spatially varying polarization.

BACKGROUND OF THE INVENTION

A homogenous linearly- or circularly-polarized light field is easy to create using polarizing sheets, multilayer filters, crystal polarizers, and quarter-wave plates, as described for example by S. G. Lipson, H. Lipson, D. S. Tannhauser, "Optical Physics", 3rd ed. Cambridge University Press (1995). It is also known how to produce a spatially-varying polarization field using liquid crystal devices as described by M. Stalder, M. Schadt, "Linearly polarized light with axial symmetry generated by liquid crystal polarization converters", Optics Letters 21, 1948 (1996); diffractive optics as described by Z. Bomzen, G. Biener, V. Kleiner, E. Hasman, "Radially and azimuthally polarized beams generated by space-variant dielectric subwavelength gratings" Optics Letters, 27, 285 (2002); and holographic filters as described by P. B. Mumola et al, "Unstable resonators for annular gain volume lasers", Applied Optics 17, 936-43, (1978).

However, the performance of these devices is usually dependent on the wavelength of the light used. Moreover, the latter two, diffractive optics and holographic filters, are relatively inefficient and are not applicable to visible light frequencies.

A device called a "reflexicon" is used as an element in annular laser resonators as described by Mumola and in R. A. Chodzko et al, "Annular resonators: some experimental studies including polarization effects", Applied Optics 19, 778-89 (1980). However, although the reflexicon does indeed sometimes modify the polarization field in a non-homogeneous way, it is not designed for producing specific polarization fields and in its published form would not be able to do this, because its polarization characteristics are determined by its geometry and the Fresnel coefficients.

In short, it has not been known how to polarize visible light in a spatially variant manner efficiently and over a wide bandwidth.

The present invention produces a light beam with spatially varying polarization. In the present invention, a homogeneous beam of light is reflected from a first reflector onto a second reflector—one reflector being a concave (converging) reflector and the other reflector being a convex (diverging) reflector (the order of which may be reversed)—the second reflector returning it to a homogeneous beam, and a polarizer between the two reflectors is used to modify the polarization field of the output beam in the required manner. By "homogeneous" it is meant, for the purpose of the present invention a beam with random polarization.

The first reflector is used to reflect the initial beam so that at least some of it is reflected with a radial component. The radial component is polarized by a polarizing sheet, provided in a radial manner in between the first and second reflectors, so that the polarized light is then reflected from the second polarizer to the desired direction. For many purposes the light reflected off the second reflector would be directed parallel to the initial beam, but this is not necessary. By a combination of the shapes of the reflectors and of the polarizer, several useful polarization fields can be achieved.

BRIEF DESCRIPTION OF THE INVENTION

There is thus provided, in accordance with a preferred embodiment of the present invention, an apparatus for providing a light beam with spatially varying polarization, the apparatus comprising:

two circumferentially curved reflectors positioned substantially opposite each other;

a polarizer positioned in an optical path between the two reflectors, for polarizing light reflected from one reflector before it reaches the other;

whereby a non-polarized light beam incident along a given axis on one of the reflectors is radially reflected off that reflector, acquires predetermined polarization from the polarizer and is then reflected off the second reflector to a light beam of spatially varying polarization.

Furthermore, in accordance with a preferred embodiment of the present invention, the two reflectors comprise a diverging reflector and a converging reflector.

Furthermore, in accordance with a preferred embodiment of the present invention, the two reflectors comprise two converging reflectors.

Furthermore, in accordance with a preferred embodiment of the present invention, the two reflectors are spherical.

Furthermore, in accordance with a preferred embodiment of the present invention, the two reflectors are conical.

Furthermore, in accordance with a preferred embodiment of the present invention, the two reflectors have each apex angle of between 20° and 75° with respect to the given axis.

Furthermore, in accordance with a preferred embodiment of the present invention, the two reflectors are paraboloidal, with a common focus.

Furthermore, in accordance with a preferred embodiment of the present invention, one of the two reflectors is hyperboloidal and the other of the two reflectors is ellipsoidal, with a common focus.

Furthermore, in accordance with a preferred embodiment of the present invention, the polarizer is radially polarizing with respect to the given axis.

Furthermore, in accordance with a preferred embodiment of the present invention, the polarizer is azimuthally polarizing with respect to the given axis.

Furthermore, in accordance with a preferred embodiment of the present invention, the polarizer is diagonally polarizing with respect to the given axis.

Furthermore, in accordance with a preferred embodiment of the present invention, the polarizer includes more than one polarization orientation.

Furthermore, in accordance with a preferred embodiment of the present invention, the apparatus further comprises a quarter-wave plate and a second plarizer positioned in a path of an outgoing beam after it leaves the two reflectors.

Furthermore, in accordance with a preferred embodiment of the present invention, the second polarizer is oriented at 45° with respect to the quarter-wave plate.

Furthermore, in accordance with a preferred embodiment of the present invention, there is provided a method for providing a light beam with spatially varying polarization, the method comprising:

providing two circumferentially curved reflectors positioned substantially opposite each other, providing a polarizer positioned in an optical path between the two reflectors, for polarizing light reflected from one reflector before it reaches the other;

directing a non-polarized light beam along a given axis onto one of the two reflectors, so that it is reflected off that reflector to the other reflector, acquiring predetermined polarization as it passes through the polarizer, and reflected off the other reflector as an outgoing light beam, whereby the outgoing beam acquires varying spatial polarization.

Furthermore, in accordance with a preferred embodiment of the present invention, providing two circumferentially curved reflectors positioned substantially opposite each other the two reflectors includes providing a diverging reflector and a converging reflector.

Furthermore, in accordance with a preferred embodiment of the present invention, providing two circumferentially curved reflectors positioned substantially opposite each other the two reflectors includes providing two converging reflectors.

Furthermore, in accordance with a preferred embodiment of the present invention, providing two circumferentially curved reflectors positioned substantially opposite each other the two reflectors includes providing two reflectors that are spherical.

Furthermore, in accordance with a preferred embodiment of the present invention, providing two circumferentially curved reflectors positioned substantially opposite each other the two reflectors includes providing two reflectors that are conical.

Furthermore, in accordance with a preferred embodiment of the present invention, providing two circumferentially curved reflectors positioned substantially opposite each other the two reflectors includes providing two reflectors, which have each apex angle of between 20° and 75° with respect to the given axis.

Furthermore, in accordance with a preferred embodiment of the present invention, providing two circumferentially curved reflectors positioned substantially opposite each other the two reflectors includes providing two reflectors, which are paraboloidal, with a common focus.

Furthermore, in accordance with a preferred embodiment of the present invention, providing two circumferentially curved reflectors positioned substantially opposite each other the two reflectors includes providing two reflectors one of which is hyperboloidal and the other reflector is ellipsoidal, with a common focus.

Furthermore, in accordance with a preferred embodiment of the present invention, providing a polarizer positioned in an optical path between the two reflectors includes providing a polarizer, which is radially polarizing with respect to the given axis.

Furthermore, in accordance with a preferred embodiment of the present invention, providing a polarizer positioned in an optical path between the two reflectors includes providing a polarizer, which is azimuthally polarizing with respect to the given axis.

Furthermore, in accordance with a preferred embodiment of the present invention, providing a polarizer positioned in an optical path between the two reflectors includes providing a polarizer, which is diagonally polarizing with respect to the given axis.

Furthermore, in accordance with a preferred embodiment of the present invention, providing a polarizer positioned in an optical path between the two reflectors includes providing a polarizer, which includes more than one polarization orientation.

Furthermore, in accordance with a preferred embodiment of the present invention, the method further comprises providing a quarter-wave plate and a second plarizer positioned in a path of an outgoing beam after it leaves the two reflectors.

Furthermore, in accordance with a preferred embodiment of the present invention, the second polarizer is oriented at 45° with respect to the quarter-wave plate.

BRIEF DESCRIPTION OF THE FIGURES

The invention is described herein, by way of example only, with reference to the accompanying Figures, in which like components are designated by like reference numerals.

DETAILED DESCRIPTION OF THE INVENTION

An aspect of the present invention is the use of projection of a homogeneous beam of light projected onto a curved reflecting surface. The light is then reflected onto a second curved reflector, which returns it to a substantially homogeneous beam, and a polarizer between the two reflectors is used to modify the polarization field of the output beam in the required manner. By a combination of the shapes of the reflectors and of the polarizer, several useful polarization fields can be achieved.

In its simplest form, the invention can be used to produce a radial or azimuthally polarized light, but many other configurations are possible too.

Figure 1:
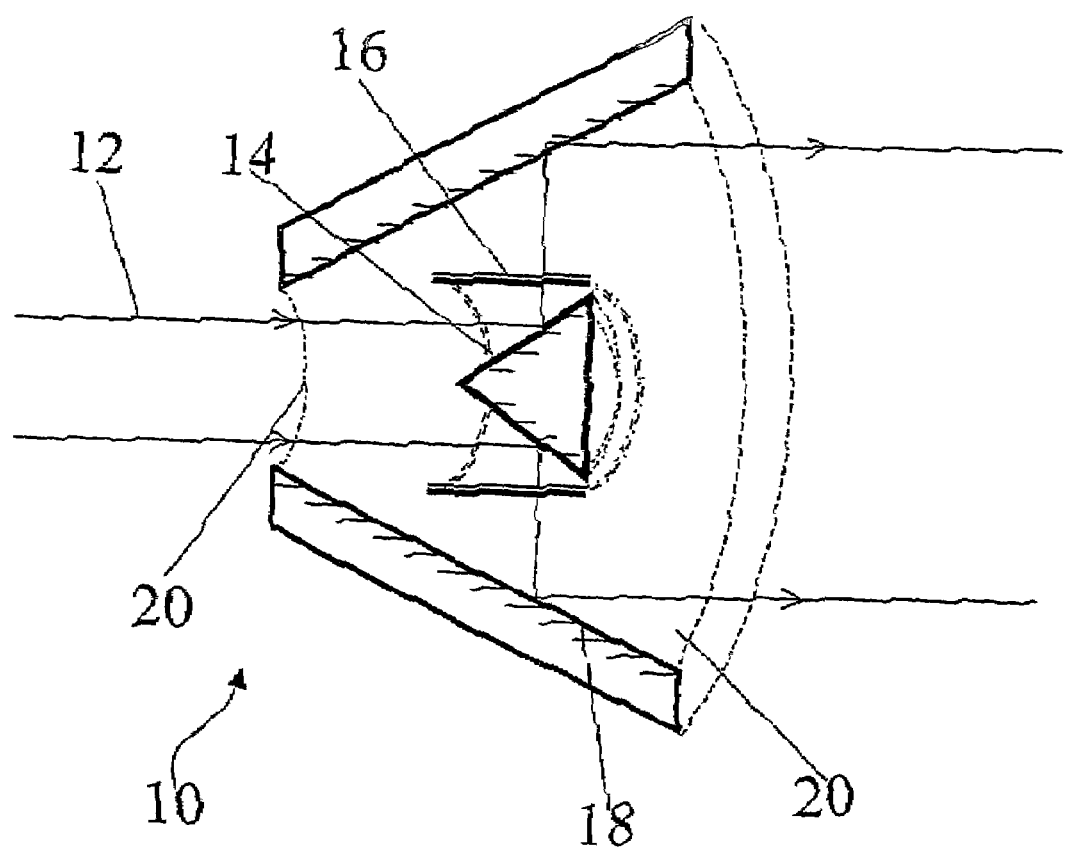
FIG. 1 is a schematic illustration of an apparatus for producing a light beam with spatially varying polarization in accordance with a preferred embodiment of the present invention.

Reference is now made to FIG. 1, which illustrates an implementation of a system for producing a light beam with spatially varying polarization 10 in accordance with a preferred embodiment of the present invention.

A parallel beam of light 12 is incident on a diverging reflector (with external reflecting surfaces) 14, which is in this embodiment in the form of a conical mirror, whose base diameter is slightly larger than the diameter of the beam, and whose apex angle is about 45°. For many purposes an apex angle in the range between 20° and 75° is very useful. The light reflected, which has the form of a disc, passes through polarizer 16, which is bent into a cylinder or other similar closed ring. After transmission through polarizer 16, the light is reflected by a second reflector 18 (with internal surface reflector), which is a conical minor, reflector 18 having the same apex angle as that of external reflector 14, and having openings 20 on its axis large enough not to obstruct the incident light beam. Annular output beam 22 is found to be polarized in a manner defined by polarizer 16. For example, if polarizer 16 is oriented in the form shown in FIG. 2a, the output beam polarization 22 is azimuthal, as shown in FIG. 3a. Another example, if polarizer 16 is oriented in the form shown in FIG. 2b, the output beam polarization 22 is radial, as shown in FIG. 3b.

The device can use standard plastic (flexible) polarizing sheet for polarizer 16 and can be designed for maximum extinction ratio in any chosen wavelength range (including white light), in accordance with available polarizers. Depending on the cut of the polarizer sheet 16 with respect to its axis, various geometries of polarization fields can be obtained.

The design of the present invention is easily modified to be a part of a focusing or imaging system, by using, for example, ellipsoidal, paraboloidal or hyperboloidal reflecting surfaces instead of the conical surfaces described above.

Figure 2A:
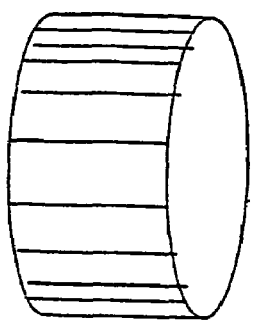
FIG. 2a is a drawing of a polarizer oriented to produce an azimuthally polarized beam.
Figure 3A:
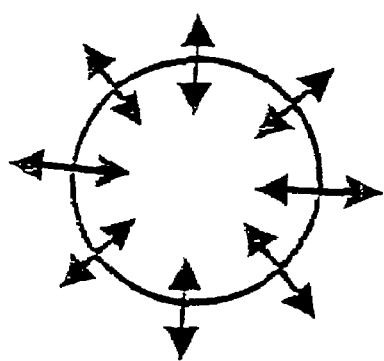
FIG. 3a is a schematic illustration of an azimuthally-polarized field created by a polarizer oriented to produce an azimuthally polarized beam (the polarizer of FIG. 2a).
Figure 3B:
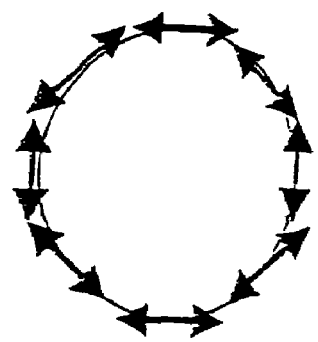
FIG. 3b is a schematic illustration of a radially-polarized field created by a polarizer oriented to produce a radially polarized beam (the polarizer of FIG. 2b).

FIG. 2a is a drawing of a polarizer oriented to produce an azimuthally polarized beam. The polarization orientation is laterally to the polarizer sheet.

Figure 2B:
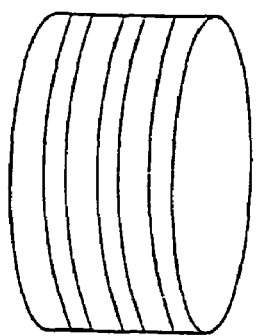
FIG. 2b is a drawing of a polarizer oriented to produce a radially polarized beam.

FIG. 2b is a drawing of a polarizer oriented to produce a radially polarized beam. The polarization orientation is longitudinal with respect to the polarizer sheet.

Figure 2C:
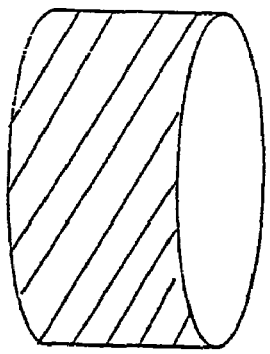
FIG. 2c is a drawing of a polarizer oriented to produce a spirally polarized beam.

FIG. 2c is a drawing of a polarizer oriented to produce a spirally polarized beam. Here the polarization orientation is diagonal with respect to the polarizer sheet.

Figure 2D:
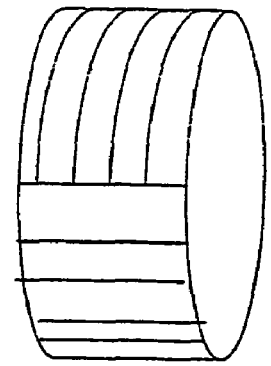
FIG. 2d is a drawing of a polarizer oriented to produce a beam with two types of polarization—half radial polarization and half azimuthal polarization.

FIG. 2d is a drawing of a polarizer oriented to produce a beam with two types of polarization—half radial polarization and half azimuthal polarization.

FIG. 3a is a schematic illustration of an azimuthally-polarized field created by a polarizer oriented to produce an azimuthally polarized beam (the polarizer of FIG. 2a).

FIG. 3b is a schematic illustration of a radially-polarized field created by a polarizer oriented to produce a radially polarized beam (the polarizer of FIG. 2b).

Figure 3C:
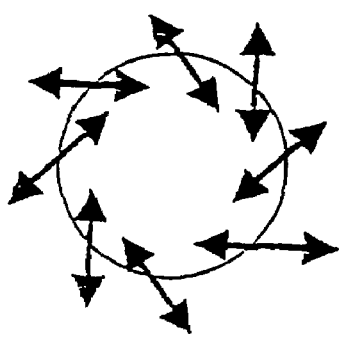
FIG. 3c is a schematic illustration of a spirally-polarized field created by a polarizer oriented to produce a radially polarized beam (the polarizer of FIG. 2c).

FIG. 3c is a schematic illustration of a spirally-polarized field created by a polarizer oriented to produce a radially polarized beam (the polarizer of FIG. 2c).

Figure 3D:
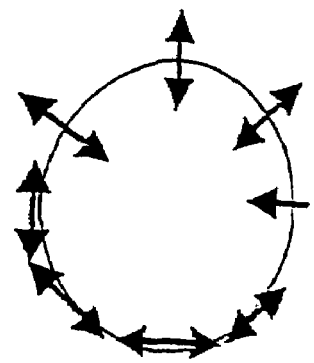
FIG. 3d is a schematic illustration of a field with two types of polarization created by a polarizer oriented to produce a beam with two types of polarization—half radial polarization and half azimuthal polarization (the polarizer of FIG. 2d).

FIG. 3d is a schematic illustration of a field with two types of polarization created by a polarizer oriented to produce a beam with two types of polarization—half radial polarization and half azimuthal polarization (the polarizer of FIG. 2d).

Figure 4A:
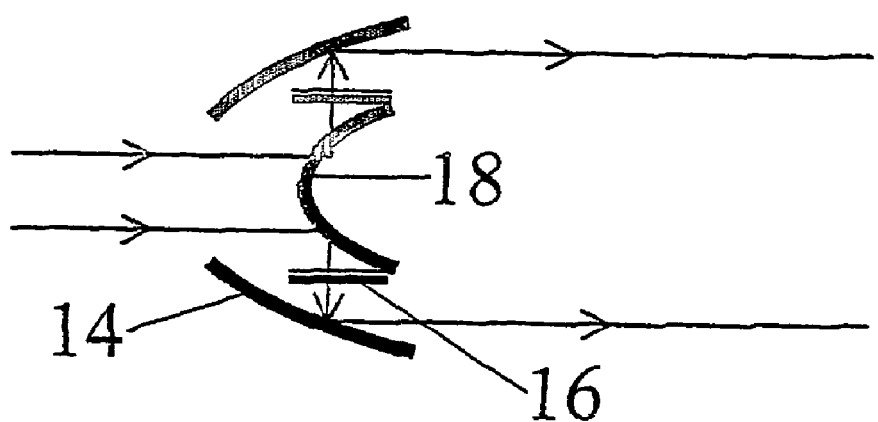
FIG. 4a illustrates sectioned view of the use of two paraboloidal reflectors to convert a parallel beam of incident light into a uniformly intense annular beam with polarization specified by the bent polarizer, in accordance with a preferred embodiment of the present invention.

FIG. 4a is an alternative implementation of a system for producing a light beam with spatially varying polarization 10 in accordance with a preferred embodiment of the present invention. In the implementation of FIG. 4a, paraboloidal mirrors having a common focus are used for reflector 14 and reflector 18. In this case, the system behaves as an afocal angular magnifier and if the incident beam has annular form and is uniform in intensity, so is the transmitted beam.

Figure 4B:
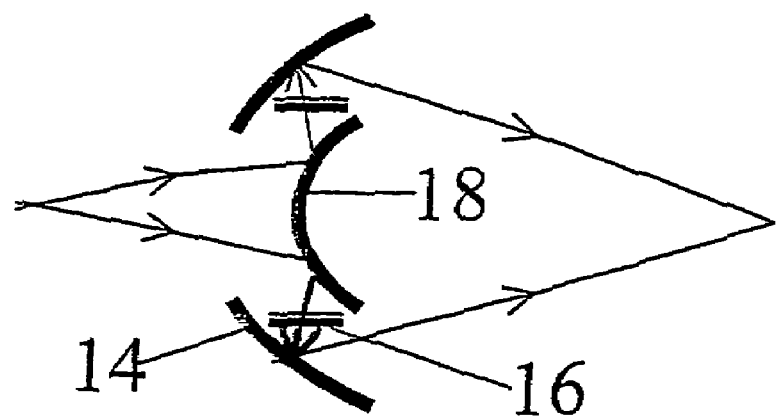
FIG. 4b illustrates sectioned view of the use of a hyperboloidal reflector and an ellipsoidal reflector to convert a cone of incident light originating from a point source into a annular image polarized in a manner specified by the bent polarizer, in accordance with a preferred embodiment of the present invention.

FIG. 4b is an alternative implementation of a system for producing a light beam with spatially varying polarization in accordance with a preferred embodiment of the present invention. In FIG. 4b, a hyperboloidal mirror is used for reflector 14 rather than a conical mirror, and an ellipsoidal outer mirror is used for reflector 18.

Figure 4C:
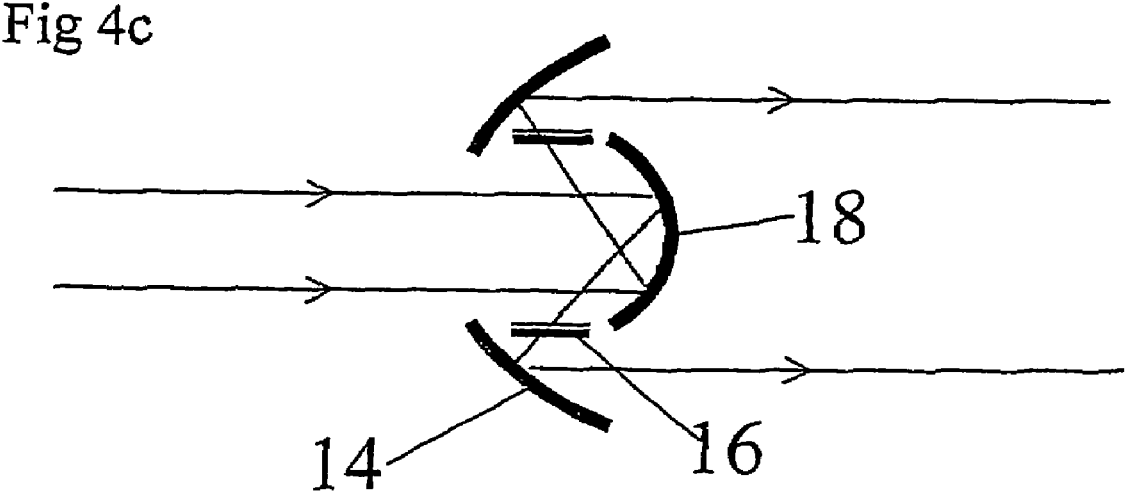
FIG. 4c illustrates sectioned view of the use of two converging reflectors to convert a parallelbeam of incident light into a uniformly intense annular beam with polarization specified by the bent polarizer, in accordance with a preferred embodiment of the present invention.

FIG. 4c illustrates sectioned view of the use of two converging reflectors 14, 18, to convert a parallel beam of incident light into a uniformly intense annular beam with polarization specified by the bent polarizer, in accordance with a preferred embodiment of the present invention.

The systems shown in FIGS. 4a, 4b and 4c have imaging properties and can be used as part of an imaging system.

The direction of the light can be reversed in all of the embodiments of the present invention, in which case an incident annular beam, produced for example by an axicon system, will be translated to a narrow beam with the desired polarization properties.

Reflector 18 can be reversed in order to return the light beam in the direction of incidence. This has the geometrical form similar to a waxicon (Mumola and Chodzko) although its purpose is different.

Figure 5:
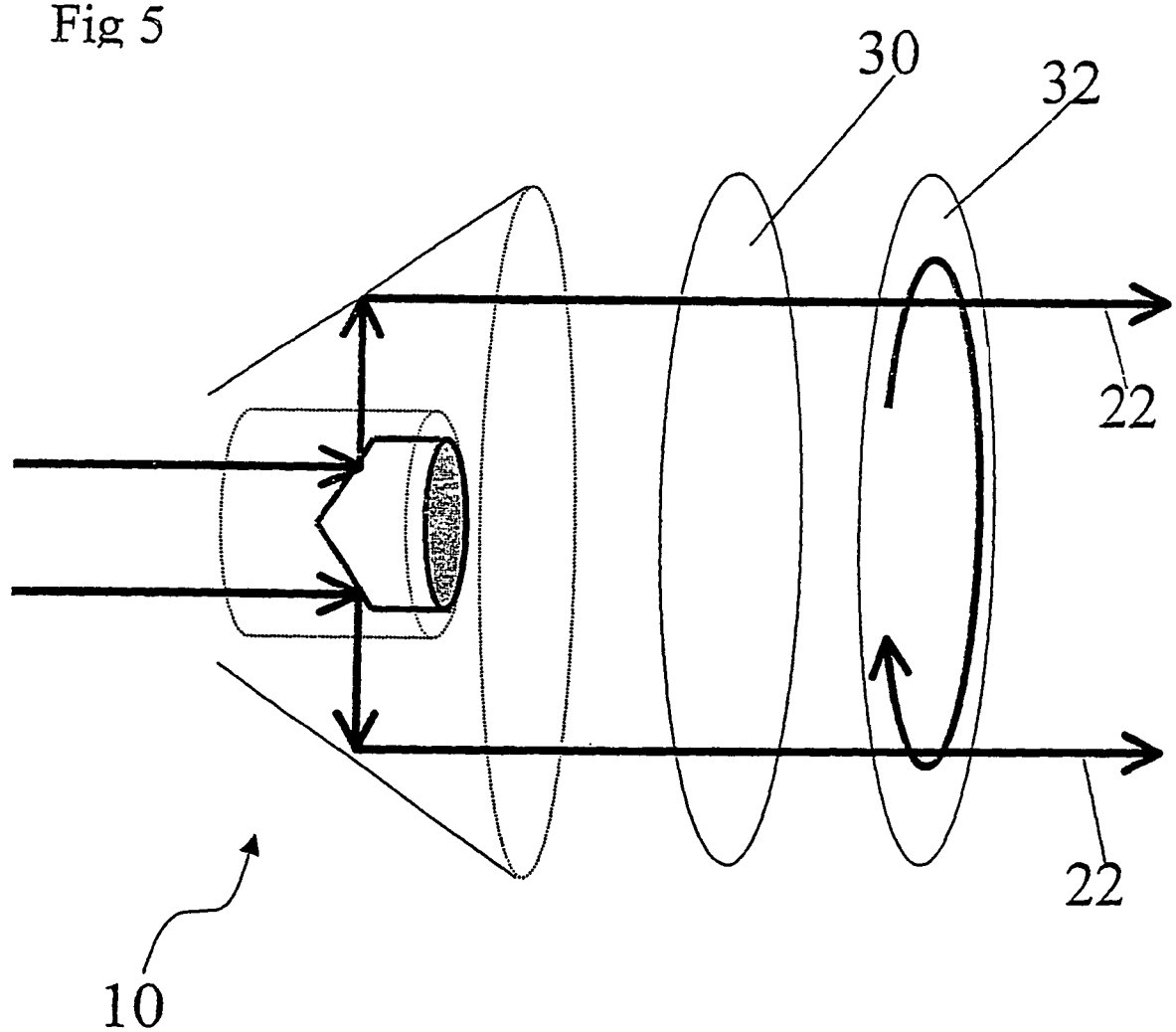
FIG. 5 illustrates an alternative implementation of a system for producing a light beam with spatially varying phase in accordance with a preferred embodiment of the present invention.

FIG. 5 illustrates an implementation of a system for producing a light beam with spatially varying phase in accordance with a preferred embodiment of the present invention. A parallel light beam is passed through an apparatus for for producing a light beam with spatially varying polarization in accordance with a preferred embodiment of the present invention (in this example the apparatus of FIG. 1). The outgoing beam is then passed through a quarter-wave plate 30 and a linear polarizer 32, preferably oriented at 45° to the axis of the quarter-wave plate, producing a beam 22 with a phase ramp, which can be used to create light beams with orbital angular momentum, showing a far-field phase dislocation.

The space-variant polarized field was conceived as a method of producing radially polarized light for interference microscopy, but various other applications can make use of this device.

Advanced microscope illumination can use this device for increasing the resolution, since the point spread function depends on the direction of polarization. Moreover, any high resolution optical system which relies on a difference between s (TE) and p (TM) polarizations, such as surface plasmon resonance or ellipsometric microscopy, can only be brought to the theoretical resolution limit by the used of such a device. The performance of optical tweezers can also be improved by using an incident beam with polarization field tailored by this invention. Advantageously, the above described invention accomplishes the object of producing a light beam with spatially varying polarization.

It should be clear that the description of the embodiments and attached Figures set forth in this specification serves only for a better understanding of the invention, without limiting its scope as covered by the following Claims or their equivalents.

It should also be clear that a person skilled in the art, after reading the present specification could make adjustments or amendments to the attached Figures and above described embodiments that would still be covered by the following Claims or their equivalents.

The invention claimed is:

1. An apparatus for providing a light beam with spatially varying polarization, the apparatus comprising:
   two circumferentially curved reflectors positioned substantially opposite each other; and
   a polarizer positioned in an optical path between the two reflectors, for polarizing light reflected from one reflector and passing through the polarizer before it reaches the other;
   whereby a non-polarized light beam incident along a given axis on one of the reflectors is radially reflected off that reflector, acquires predetermined polarization by passing through the polarizer and is then reflected off the second reflector to produce an outgoing light beam of spatially varying polarization.

2. The apparatus as claimed in claim 1, wherein the two reflectors comprise a diverging reflector and a converging reflector.

3. The apparatus as claimed in claim 1, wherein the two reflectors comprise two converging reflectors.

4. The apparatus as claimed in claim 1, wherein the two reflectors are spherical.

5. The apparatus as claimed in claim 1, wherein the two reflectors are conical.

6. The apparatus as claimed in claim 5, wherein the two reflectors have each apex angle of between 20° and 75° with respect to the given axis.

7. The apparatus as claimed in claim 1, wherein the two reflectors are paraboloidal, with a common focus.

8. The apparatus as claimed in claim 1, wherein one of the two reflectors is hyperboloidal and the other of the two reflectors is ellipsoidal, with a common focus.

9. The apparatus as claimed in claim 1 in which the polarizer is radially polarizing with respect to the given axis.

10. The apparatus as claimed in claim 1 in which the polarizer is azimuthally polarizing with respect to the given axis.

11. The apparatus as claimed in claim 1 in which the polarizer is diagonally polarizing with respect to the given axis.

12. The apparatus as claimed in claim 1 in which the polarizer includes more than one polarization orientation.

13. The apparatus as claimed in claim 1 further comprising a quarter-wave plate and a second polarizer positioned in a path of an outgoing beam after it leaves the two reflectors.

14. The apparatus as claimed in claim 13, wherein the second polarizer is oriented at 45° with respect to the quarter-wave plate.

15. A method for providing a light beam with spatially varying polarization, the method comprising:
    providing two circumferentially curved reflectors positioned substantially opposite each other;
    providing a polarizer positioned in an optical path between the two reflectors, for polarizing light reflected from one reflector before it reaches the other; and
    directing a non-polarized light beam along a given axis onto one of the two reflectors, so that it is reflected off that reflector to the other reflector, acquiring predetermined polarization as it passes through the polarizer, and reflected off the other reflector as an outgoing light beam,
    whereby the outgoing beam acquires varying spatial polarization.

16. The method as claimed in claim 15, wherein providing two circumferentially curved reflectors positioned substantially opposite each other the two reflectors includes providing a diverging reflector and a converging reflector.

17. The method as claimed in claim 15, wherein providing two circumferentially curved reflectors positioned substantially opposite each other the two reflectors includes providing two converging reflectors.

18. The method as claimed in claim 15, wherein providing two circumferentially curved reflectors positioned substantially opposite each other the two reflectors includes providing two reflectors that are spherical.

19. The method as claimed in claim 15, wherein providing two circumferentially curved reflectors positioned substantially opposite each other the two reflectors includes providing two reflectors that are conical.

20. The method as claimed in claim 19, wherein providing two circumferentially curved reflectors positioned substantially opposite each other the two reflectors includes providing two reflectors, which have each apex angle of between 20° and 75° respect to the given axis.

21. The method as claimed in claim 15, wherein providing two circumferentially curved reflectors positioned substantially opposite each other the two reflectors includes providing two reflectors, which are paraboloidal, with a common focus.

22. The method as claimed in claim 15, wherein providing two circumferentially curved reflectors positioned substantially opposite each other the two reflectors includes providing two reflectors one of which is hyperboloidal and the other reflector is ellipsoidal, with a common focus.

23. The method as claimed in claim 15, wherein providing a polarizer positioned in an optical path between the two reflectors includes providing a polarizer, which is radially polarizing with respect to the given axis.

24. The method as claimed in claim 15, wherein providing a polarizer positioned in an optical path between the two reflectors includes providing a polarizer, which is azimuthally polarizing with respect to the given axis.

25. The method as claimed in claim 15, wherein providing a polarizer positioned in an optical path between the two reflectors includes providing a polarizer, which is diagonally polarizing with respect to the given axis.

26. The method as claimed in claim 15, wherein providing a polarizer positioned in an optical path between the two reflectors includes providing a polarizer, which includes more than one polarization orientation.

27. The method as claimed in claim 15, further comprising providing a quarter-wave plate and a second polarizer positioned in a path of an outgoing beam after it leaves the two reflectors.

28. The method as claimed in claim 27, wherein the second polarizer is oriented at 45° with respect to the quarter-wave plate.

* * * * *